(12) United States Patent
Kwon et al.

(10) Patent No.: US 10,200,409 B2
(45) Date of Patent: Feb. 5, 2019

(54) APPARATUS AND METHOD FOR SECURITY POLICY MANAGEMENT

(71) Applicant: Korea Electric Power Corporation, Seoul (KR)

(72) Inventors: Yoojin Kwon, Daejeon (KR); Yonghun Lim, Daejeon (KR); Seongho Ju, Daejeon (KR); Moonseok Choi, Daejeon (KR); Yooseok Lim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 0 days.

(21) Appl. No.: 15/093,514

(22) Filed: Apr. 7, 2016

(65) Prior Publication Data

US 2017/0295205 A1    Oct. 12, 2017

(51) Int. Cl.
*H04L 12/24* (2006.01)
*H04L 29/06* (2006.01)

(52) U.S. Cl.
CPC .......... *H04L 63/20* (2013.01); *H04L 41/0813* (2013.01); *H04L 41/0816* (2013.01); *H04L 63/10* (2013.01); *H04L 63/0263* (2013.01)

(58) Field of Classification Search
CPC ....... H04L 63/20; H04L 63/10; H04L 63/101; H04L 63/102; H04L 63/105; H04L 63/1433; H04L 63/0263; H04L 63/1408; H04L 41/0813; H04L 41/0816; H04L 41/0893; H04L 41/12; H04L 45/02
See application file for complete search history.

(56) References Cited

U.S. PATENT DOCUMENTS

| | | | |
|---|---|---|---|
| 7,844,563 B2 * | 11/2010 | Farah | G06N 5/025 706/47 |
| 2002/0124067 A1 * | 9/2002 | Parupudi | G06F 21/62 709/223 |
| 2004/0193912 A1 * | 9/2004 | Li | G06F 21/55 726/14 |
| 2005/0091346 A1 * | 4/2005 | Krishnaswami | G06F 9/44505 709/220 |

(Continued)

FOREIGN PATENT DOCUMENTS

KR    10-2009-0035192 A    4/2009
KR    10-0989347 B1    10/2010

(Continued)

*Primary Examiner* — Tae K Kim

(74) *Attorney, Agent, or Firm* — McDermott Will & Emery LLP

(57) ABSTRACT

Disclosed herein are an apparatus and method for security policy management, which manages a network access policy in order to integrate distributed security policies and to apply the integrated security policy in a smart grid environment. The apparatus for security policy management includes a rule set generation unit for generating a rule set by converting predefined access policy security rules, acquired from one or more systems, into a document in a standard format, a topology extraction unit for extracting a network topology from a network diagram of the one or more systems, and a standard policy generation unit for generating a standard policy by combining the generated rule set with the extracted topology.

16 Claims, 11 Drawing Sheets

(56) References Cited

U.S. PATENT DOCUMENTS

| | | | | |
|---|---|---|---|---|
| 2006/0031447 A1* | 2/2006 | Holt | ................. | H04L 41/00 709/223 |
| 2008/0209505 A1* | 8/2008 | Ghai | ................. | G06F 21/55 726/1 |
| 2008/0301765 A1* | 12/2008 | Nicol | ................. | H04L 41/142 726/1 |
| 2012/0266209 A1* | 10/2012 | Gooding | ................. | H04L 63/20 726/1 |
| 2013/0081101 A1* | 3/2013 | Baer | ................. | G06F 21/577 726/1 |
| 2013/0104236 A1* | 4/2013 | Ray | ................. | H04L 63/1433 726/25 |
| 2014/0223176 A1* | 8/2014 | Hajost | ................. | H04L 63/0428 713/165 |
| 2014/0282850 A1* | 9/2014 | Mattes | ................. | H04L 63/0272 726/1 |
| 2015/0193629 A1* | 7/2015 | Hajost | ................. | G06F 21/602 713/189 |
| 2016/0014158 A1* | 1/2016 | Schrecker | ................. | H04L 63/0869 726/1 |
| 2016/0219077 A1* | 7/2016 | Pandya | ................. | H04L 63/20 |

FOREIGN PATENT DOCUMENTS

| | | |
|---|---|---|
| KR | 2011-0081445 A | 7/2011 |
| KR | 10-1375813 B1 | 3/2014 |

\* cited by examiner

```
# All other accounts are allowed to login from anywhere.

# esna - test rule
# allow - serial console port
+ : root : ttyS0
- : ALL
```

```
Raw SCL File (XML):

<VoltageLevelsxy:x="10" sxy:y="185" name="E1"
xmlns:sky="http://www.iec.ch/61850/2003/SCLcoordinates">
<Text/>
<Voltage unit="V" multipliar="k"> 132 </Voltage>
<Bay sxy:x="522" sxy:y="320" name="Q1">
<Text/>
</LNode>
<LNode lnInst="1" lnClass="PDIS" iedName="E1Q1BP3" IdInst="F1">
<Text/>
</LNode>
<LNode lnInst="1" lnClass="PDIF" iedName="E1Q1BP2" IdInst="F1">
```

FIG. 3

```
<domain name="Substation_A" ASID="12345">
    <info>
        <date>2013-04-16</date>
        <description> This domain covers substation A.</description>
    </info>
    <topology>
        <nodes>
            <node id="router1.sel.net">
                <rid>10. 0. 0. 1</rid>
                <interfaces>
                    <interface id="10. 0. 2. 0/30">
                        <ip mask="10. 0. 2. 0/30">10. 0. 2. 1</ip>
                    </interface>
                </interfaces>
            </node>
            <node id="router2.sel.net">
                <rid>10. 0. 0. 2</rid>
                <interfaces>
                    <interface id="10. 0. 3. 0/30">
                        <ip mask="10. 0. 3. 0/30">10. 0. 3. 2</ip>
                    </interface>
                </interfaces>
            </node>
            . . .
        </nodes>
        <links>
            <link id="1 ->2">
                <from if="10. 0. 2. 0/30" node="10. 0. 0. 1"/>
                <to if="10. 0. 2. 0/30" node="10. 0. 0. 2"/>
            </link>
            . . .
        </links>
    </topology>
</domain>
```

FIG. 5

APPARATUS AND METHOD FOR SECURITY POLICY MANAGEMENT

BACKGROUND OF THE INVENTION

1. Technical Field

The present invention relates generally to an apparatus and method for security policy management. More particularly, the present invention relates to an apparatus and method for security policy management, which manages a network access policy in order to integrate distributed security policies in a smart grid environment and to apply the integrated security policy.

2. Description of the Related Art

With the development of smart grids, various kinds of systems are increasingly being supplied. These systems have different access control policies and different security levels. Also, the administrator of each of the systems manages the access control policy of the corresponding system using its own expression rule.

Systems having different security levels have a hardware firewall arranged at a boundary therebetween, and it is managed through minimum access control. In such a system structure, the security of a system may be guaranteed only when an access control policy that is suitable for an authority or role, such as maintenance, operations, or system management, is managed. Therefore, security policy-related tasks are regarded as important management tasks. However, because each of the systems still requires manual collection and application of the access control policies of the respective systems, it takes a lot of time and expense to manage them.

Also, when the government or international standardization organizations release new access policies or when a new system is added, it is inconvenient to apply such a new access policy to existing systems.

Due to configuration change to a system during operation, either a policy is omitted, human error occurs, or policies conflict when policies are integrated, the problem may not be detected until a security incident occurs.

Existing management of access control policies is performed in such a way that a user opens a file in which policies are specified, sets a corresponding policy, and then saves it. Based on such a security policy, unauthorized access detection is performed through Pluggable Authentication Modules (PAM).

PAM is an industry-standard authentication framework. A system administrator may apply PAM to a system for performing authentication. The application of PAM is advantageous in that an access control policy may be managed without modifying existing applications such as login, rsh, su, ftp, telnet, and the like.

However, an access control policy file must be written manually by a system administrator. Particularly in a smart grid environment, in which various kinds of systems and operating systems are integrated and managed, it takes a lot of time and expense to collect and edit access control policy files of each of the systems for the integrated management of the access control policies of the different systems.

Also, even if only one policy of a system is changed, the above-mentioned work may cause problems such as omission of the policy, error, and conflicts between policies in the integrated system. Furthermore, when such a problem occurs, it is difficult to detect the actual situation. Also, if security is not guaranteed during a verification process, the access control policy may become a useless security tool.

Recently, with the automation of power systems, standardized communication technology is applied for the effective construction and operation of power systems. Accordingly, a connection point to the outside is established, which places greater emphasis on security. In the real world, the occurrence of cyber attacks on power systems has raised awareness of the need for security.

Therefore, in order to guarantee the security of a power system based on IEC 61850, there is the need for an apparatus and method for managing network access policies in order to integrate distributed security policies and to apply an integrated security policy in a smart grid environment based on IEC 61850.

SUMMARY OF THE INVENTION

An object of the present invention is to automatically collect various types of security rules from systems and to integrate the rules according to a standard format in order to enable the accurate analysis of conflicts between network access policies and errors in the policies.

Also, another object of the present invention is to integrate distributed security policies and to apply the integrated security policy in a smart grid environment based on IEC 61850 in order to maximize the security of interoperation between systems in a smart grid environment.

According to an embodiment of the present invention, an apparatus for security policy management includes a rule set generation unit for generating a rule set by converting predefined access policy security rules acquired from one or more systems into a document in a standard format; a topology extraction unit for extracting a network topology from a network diagram concerning the one or more systems; and a standard policy generation unit for generating a standard policy by combining the generated rule set with the extracted topology.

The apparatus may further include a consistency check unit for determining whether a security rule of a new system or a security rule of a changed system is capable of being included as a part of the standard policy.

The rule set generation unit may acquire security rules, having types corresponding to one or more of an access control server system, a configuration of a PC, and a document file, from one or more systems.

The rule set generation unit may generate the rule set by converting the acquired access policy security rules into an XML format and store the converted rule set.

The topology extraction unit may extract the network topology in an XML format and store the extracted network topology.

The topology may include a kind and a configuration of multiple electric power devices existing at a site and information about a network between the multiple electric power devices.

The standard policy generation unit may generate the standard policy in an XML format and store the generated standard policy.

The consistency check unit may include a standard policy revision unit for revising the standard policy by defining the security rule of the new system or the security rule of the changed system as an exception to the standard policy when it is determined that the security rule of the new system or the security rule of the changed system is incapable of being included as a part of the standard policy.

The consistency check unit may include a violation display unit, and when it is determined that the security rule of the new system or the security rule of the changed system is incapable of being included as a part of the standard policy, the violation display unit marks a section that is incapable of being included as a part of the standard policy in the security rule of the new system or in the security rule of the changed system and then provides the security rule to an administrator.

The consistency check unit may include a standard policy transfer unit for transferring the standard policy to one or more systems when it is determined that the security rule of the new system or the security rule of the changed system is capable of being included as a part of the standard policy.

According to another embodiment of the present invention, a method for security policy management include generating a rule set by converting predefined access policy security rules acquired from one or more systems into a document in a standard format; extracting a network topology from a network diagram concerning the one or more systems; and generating a standard policy by combining the generated rule set with the extracted topology.

The method may further include checking a consistency by determining whether a security rule of a new system or a security rule of a changed system is capable of being included as a part of the standard policy, after generating the standard policy.

Generating the rule set may be configured to acquire security rules, having types corresponding to one or more of an access control server system, a configuration of a PC, and a document file, from one or more systems.

Generating the rule set may be configured to generate the rule set by converting the acquired access policy security rules into an XML format and to store the converted rule set.

Extracting the network topology may be configured to extract the network topology in an XML format and to store the extracted network topology.

The topology may include a kind and a configuration of multiple electric power devices existing at a site and information about a network between the multiple electric power devices.

Generating the standard policy may be configured to generate the standard policy in an XML format and to store the generated standard policy.

If it is determined in the checking the consistency that the security rule of the new system or the security rule of the changed system is incapable of being included as a part of the standard policy, the method may further include revising the standard policy by defining the security rule of the new system or the security rule of the changed system as an exception to the standard policy, after checking the consistency.

If it is determined in the checking the consistency that the security rule of the new system or the security rule of the changed system is incapable of being included as a part of the standard policy, the method may further include marking a section that is incapable of being included as a part of the standard policy in the security rule of the new system or in the security rule of the changed system and then providing the security rule to an administrator, after checking the consistency.

If it is determined in the checking the consistency that the security rule of the new system or the security rule of the changed system is capable of being included as a part of the standard policy, the method may further include transferring the standard policy to one or more systems, after checking the consistency.

BRIEF DESCRIPTION OF THE DRAWINGS

The above and other objects, features and advantages of the present invention will be more clearly understood from the following detailed description taken in conjunction with the accompanying drawings, in which:

FIG. 3 is an embodiment of a Substation Configuration Language (SCL) file, (R.xml), which is obtained by converting an acquired access policy security rule into an eXtensible Markup Language (XML) format;

FIG. 5 is an embodiment of a network topology file (T.xml), extracted in XML format;

DESCRIPTION OF THE PREFERRED EMBODIMENTS

Figures 1, 2:
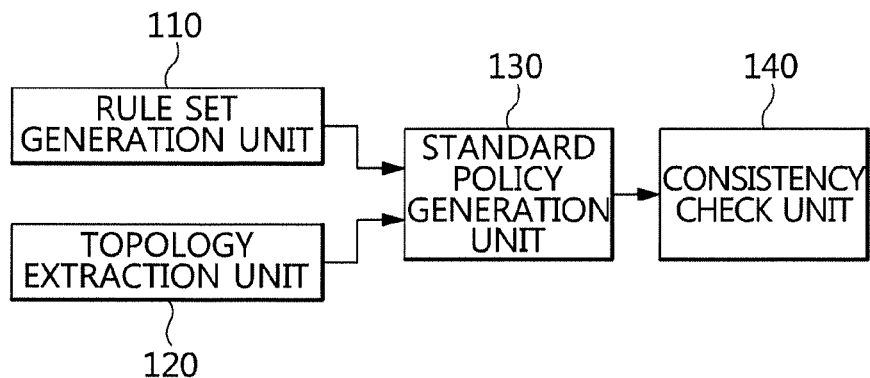
FIG. 1 is a block diagram of a security policy management apparatus according to the present invention.
FIG. 2 is an embodiment of an access policy security rule acquired from one or more systems.

The present invention will be described in detail below with reference to the accompanying drawings. Repeated descriptions and descriptions of known functions and configurations which have been deemed to make the gist of the present invention unnecessarily obscure will be omitted below.

The embodiments of the present invention are intended to fully describe the present invention to a person having ordinary knowledge in the art to which the present invention pertains.

Accordingly, the shapes, sizes, etc. of components in the drawings may be exaggerated in order to make the description clearer.

FIG. 1 is a block diagram of a security policy management apparatus according to the present invention.

Referring to FIG. 1, a security policy management apparatus 100 includes a rule set generation unit 110 for generating a rule set by converting predefined access policy security rules, acquired from one or more systems, into a document in a standard format, a topology extraction unit 120 for extracting a network topology from the network diagram of an entire system, the security rules of which are to be integrated, and a standard policy generation unit 130 for generating a standard policy by combining the rule set, generated by the rule set generation unit 110, with the topology, extracted by the topology extraction unit 120.

Here, the security policy management apparatus 100 may further include a consistency check unit 140 for determining whether the security rule of a new system or the security rule of a changed system may be included as part of the standard policy.

The rule set generation unit 110 serves to generate a rule set by converting predefined access policy security rules, acquired from one or more systems, into a document in a standard format.

Specifically, access policy security rules, having types corresponding to one or more of an access control server system, the configuration of a PC, and a document file, may be acquired from one or more systems.

In other words, because respective systems may each have various types of access policy security rules, when the rule set generation unit 110 acquires access policy security rules, various types of access policy security rules may be acquired from the multiple systems.

The access policy security rule is mainly a natural language type of rule, or is usually defined by the administrator of each of the systems.

FIG. 2 is an embodiment of an access policy security rule acquired from one or more systems.

Describing an example of an access policy security rule with reference to FIG. 2, the '+' sign is used as a symbol indicating that access is allowed, and the '−' sign is used as a symbol indicating that access is forbidden.

A specific user and user group are written in the second element, and an authority name or a function name, used in the policy, is written in the third element.

The rule set generation unit 110 generates a rule set by converting the acquired access policy security rule into an XML format and stores the converted rule set.

Figure 4:
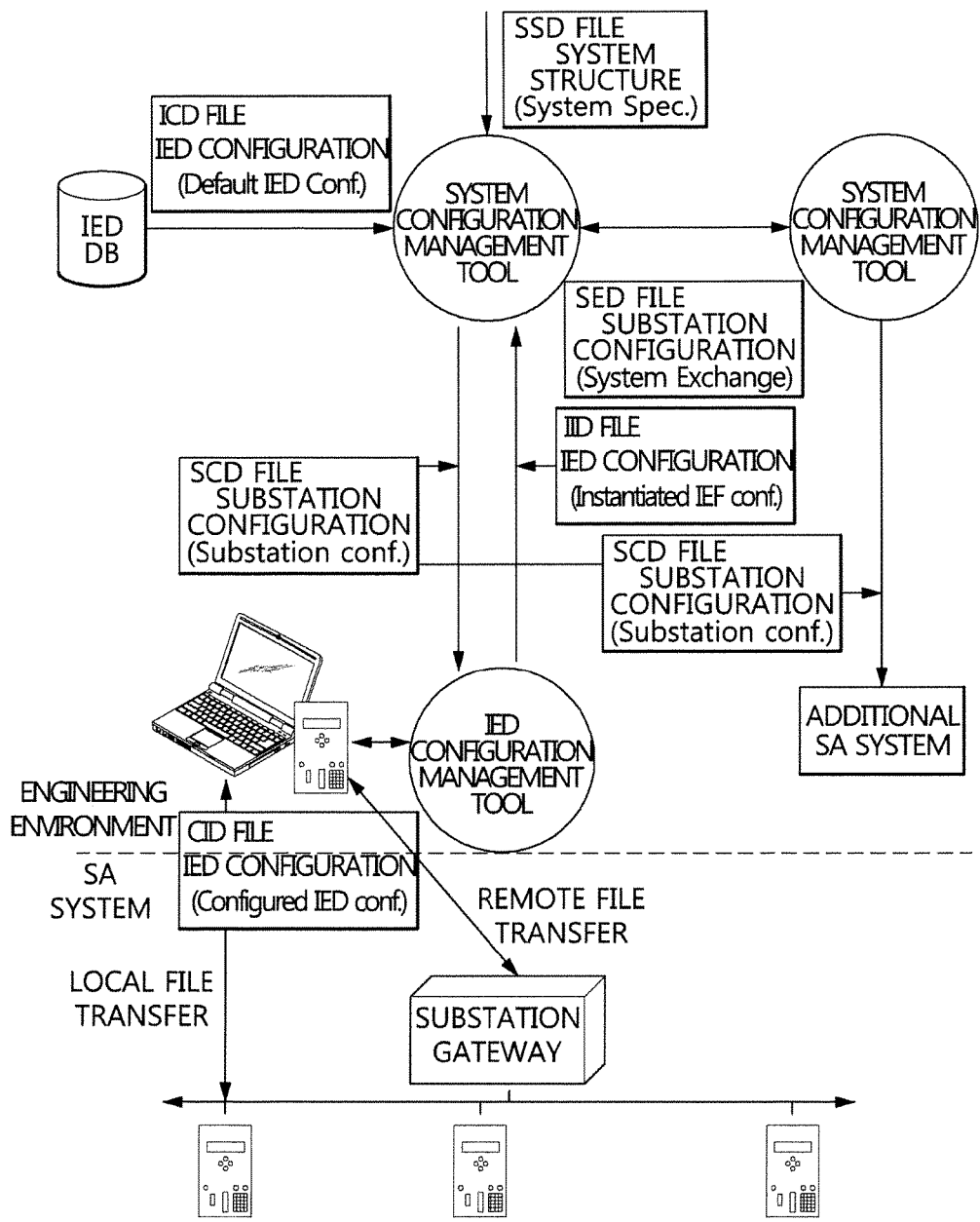
FIG. 4 is a view illustrating the type of an SCL file.

FIG. 3 is an embodiment of a Substation Configuration Language (SCL) file (R.xml), obtained by converting the acquired access policy security rule into an eXtensible Markup Language (XML) format. FIG. 4 is a view illustrating the type of an SCL file.

The access policy security rule, acquired from one or more systems, is configured as a natural language type of rule set. This access policy security rule is converted into an XML document and is then stored as a rule set (R.xml).

Referring to FIG. 4, a system based on IEC 61850 basically uses Substation Configuration Language (SCL), and SCL files may be classified into various types such as SSD, SCD, ICD, CID, and the like, depending on the transfer path of a file.

These SCL files are written in an XML format-based language by applying a method specified by the IEC international standards. Therefore, the key of the present invention is the process of adding a verified standard policy file (P.xml) in the lowermost part of the existing SCL file for each of the systems.

The topology extraction unit 120 serves to extract a network topology from the network diagram of an entire system, the security rules of which are to be integrated.

Here, the topology extraction unit 120 may extract the network topology in XML format and store the extracted network topology.

Also, the topology includes the types and configurations of multiple electric power devices existing at a site and information about the network between the multiple electric power devices.

FIG. 5 is an embodiment of a network topology file (T.xml) extracted in XML format.

Referring to FIG. 5, the topology applies an XML standard format, and the interface, the IP address, and the like of devices are written in <node> fields.

Also, information about a network between devices is written in <link> fields, and the direction of the network is indicated using <from> and <to> fields. Because there are many cases in which a network between electric devices having different security levels has a unidirectional flow, fields for indicating the direction are specified.

The standard policy generation unit 130 serves to generate a standard policy by combining the generated rule set with the extracted topology.

Here, the standard policy generation unit 130 may generate the standard policy in XML format and store the generated standard policy.

The rule set (R.xml) generated by the rule set generation unit 110 and the topology (T.xml) extracted by the topology extraction unit 120 merge to generate a single standard policy file (P.xml).

The standard policy file is the final result of the present invention. When the consistency verification, which will be described later, is completed, the standard policy file (P.xml) is released to the distributed systems. This standard policy file commonly refers to a document in which a security policy that applies the government policy and international standards is written. However, the present invention extends the role of the standard policy file, so that the standard policy file is defined as a final policy signature of the security management department, which includes all the security policies of the distributed systems. Therefore, the standard policy may be represented as the following Equation (1):

$$P_i = \sum_{j=1}^{k} R_{i,j} \cup T_i \qquad (1)$$

Here, it is assumed that, when the i-th security policy management task is performed, the security policy $R_{i,j}$ is applied to the j-th system and the network topology $T_i$ is generated. In this case, the standard policy $P_i$ is represented as a union of the two sets, $R_{i,j}$ and $T_i$.

The consistency check unit 140 serves to determine whether the security rule of a new system or the security rule of a changed system may be included as part of the standard policy.

Figure 6:
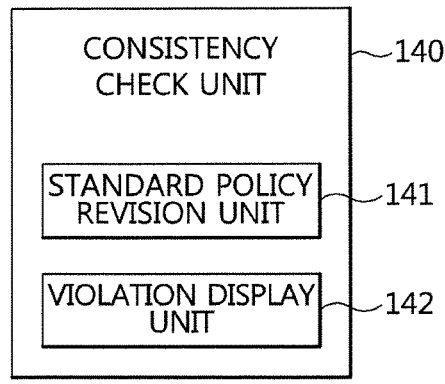
FIG. 6 is a view illustrating the configuration of a consistency check unit of a security policy management apparatus according to the present invention.

FIG. 6 is a view illustrating the configuration of a consistency check unit of a security policy management apparatus according to the present invention.

Referring to FIG. 6, the consistency check unit 140 includes a standard policy revision unit 141 and a violation display unit 142.

When it is determined that the security rule of a new system or the security rule of a changed system cannot be included as part of the standard policy, the standard policy revision unit 141 revises the standard policy by defining the security rule of the new system or the security rule of the changed system as exceptions to the standard policy.

Also, when it is determined that the security rule of a new system or the security rule of a changed system cannot be included in the standard policy, the violation display unit 142 marks the section that cannot be included as part of the standard policy in the security rule of the new system or the security rule of the changed system and provides the result to an administrator.

The consistency check unit 140 will be described in detail with reference to the following Equation (2) and Equation (3):

$$R_{n+1} \subset \sum_{j=1}^{k} R_{i,j} \cup T_i \quad (2)$$

$$R'_n \subset \sum_{j=1}^{k} R_{i,j} \cup T_i \quad (3)$$

The consistency verification process, performed when a new system (n+1) is added, may be represented as Equation (2). This process is performed in order to check whether the security rule $R_{n+1}$ of the new system can be included as part of the standard policy.

Also, the consistency verification process, performed when a system is changed, may be represented as Equation (3). This process is performed in order to check whether the security rule $R_n'$ of the changed system can be included as part of the standard policy.

Figure 7:
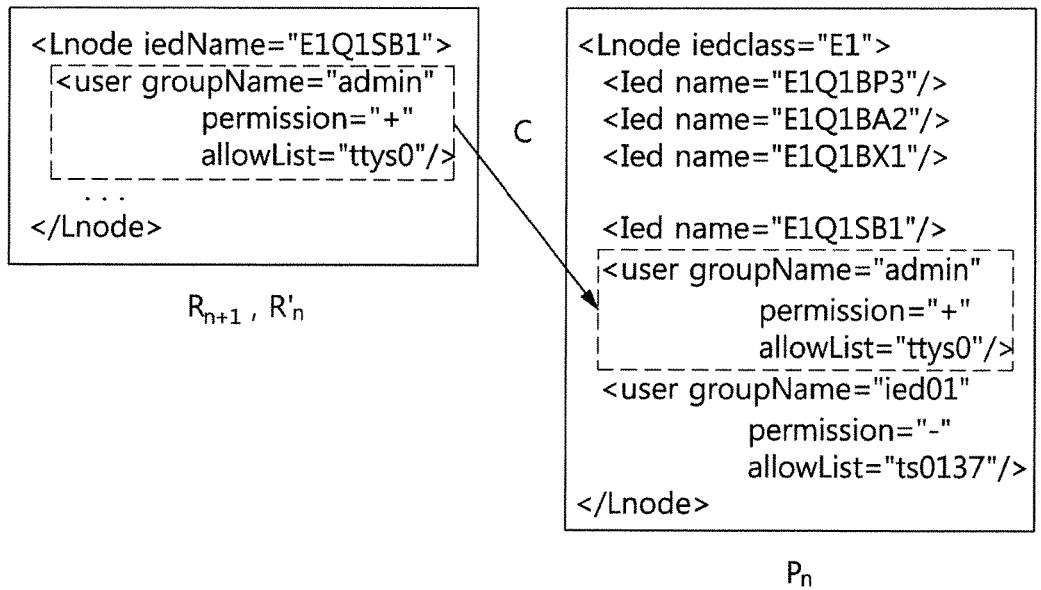
FIG. 7 is an embodiment in which the consistency check unit of the security policy management apparatus according to the present invention verifies consistency.

FIG. 7 is an embodiment in which a consistency check unit of a security policy management apparatus according to the present invention verifies consistency.

Referring to FIG. 7, in order to check whether the security rule of a new system or a changed system can be merged as part of the existing standard policy, similarity with all the entities in the standard policy is checked for by comparing the security rule with each of the entries in the standard policy. Then, the security rule may be added in a section in which an entry that completely conforms to the security rule is written or in a section in which an entry that is most similar to the security rule is written.

Here, if no policy violation is found, the standard policy (P.xml) is released to the distributed system. The first released standard policy may be a combination of the first rule set and a network topology, as represented in Equation (1).

The released standard policy (P.xml) is managed by being merged in an existing SCL file.

Figure 8:
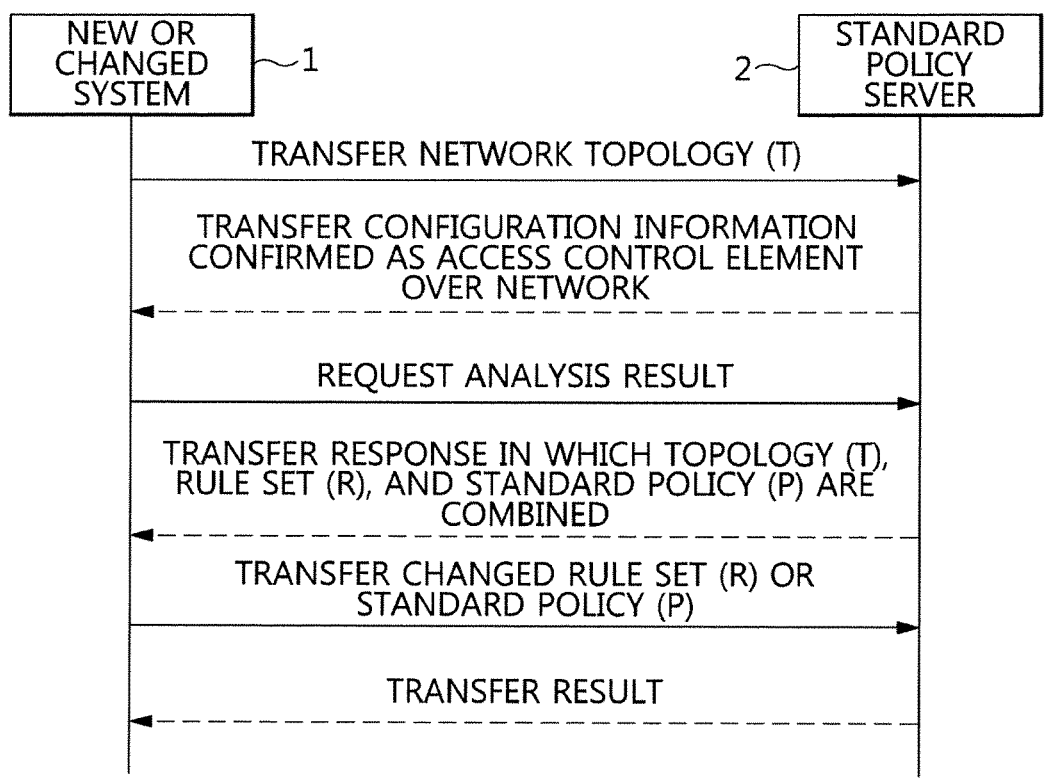
FIGS. 8 and 9 show a first embodiment of the process in which a consistency check unit verifies consistency.
Figure 9:
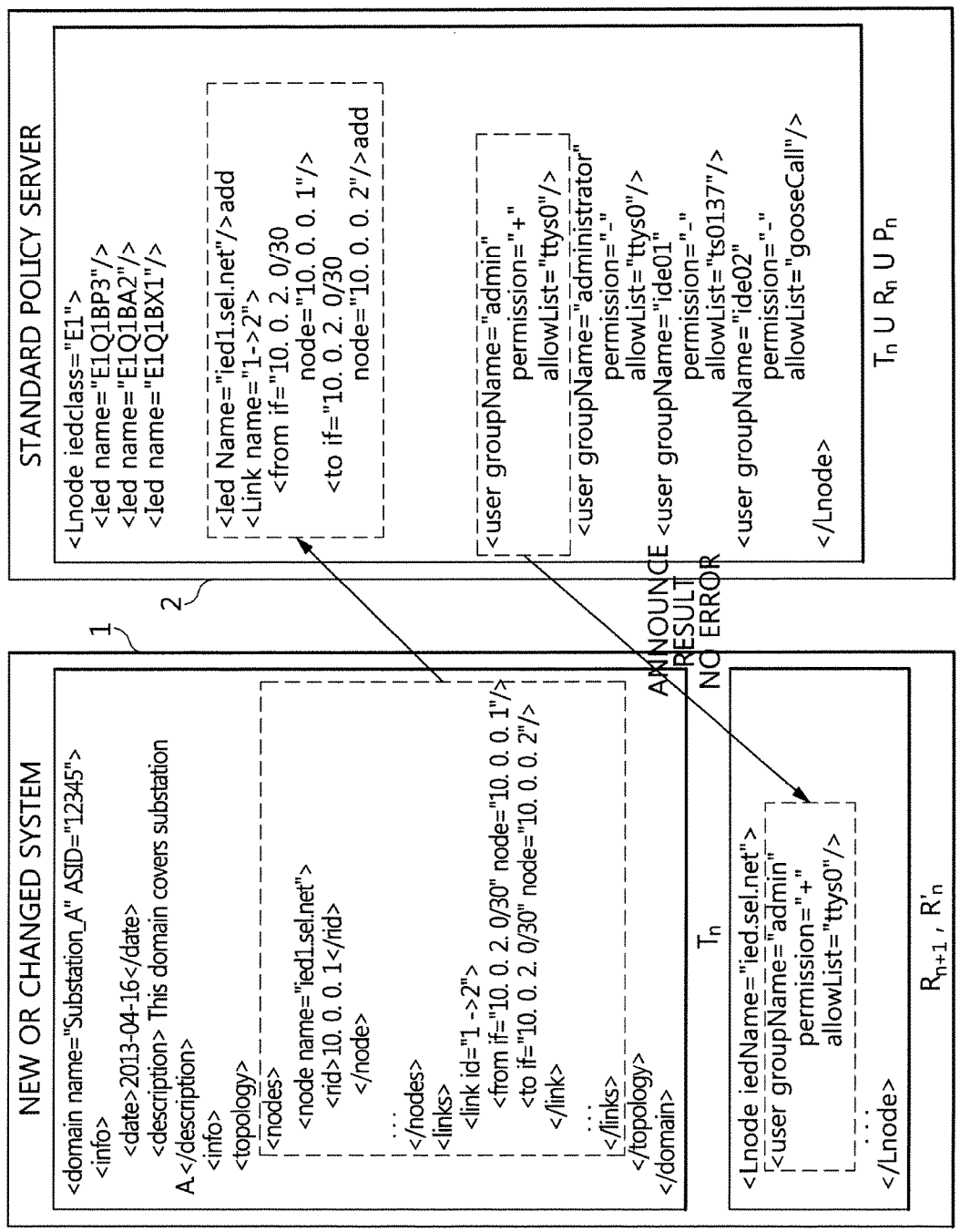

FIGS. 8 and 9 illustrate a first embodiment of the process in which a consistency check unit verifies consistency.

Referring to FIGS. 8 and 9, after a standard policy (P.xml) has been generated, if a new smart grid system is added or a smart grid system is changed, the new system or the changed system 1 sends a network topology (T.xml) and receives a changed access policy from a standard policy server 2. Here, the rule set of each of the systems is sent in the form of R.xml, and the standard policy is sent in the form of P.xml.

Figure 10:
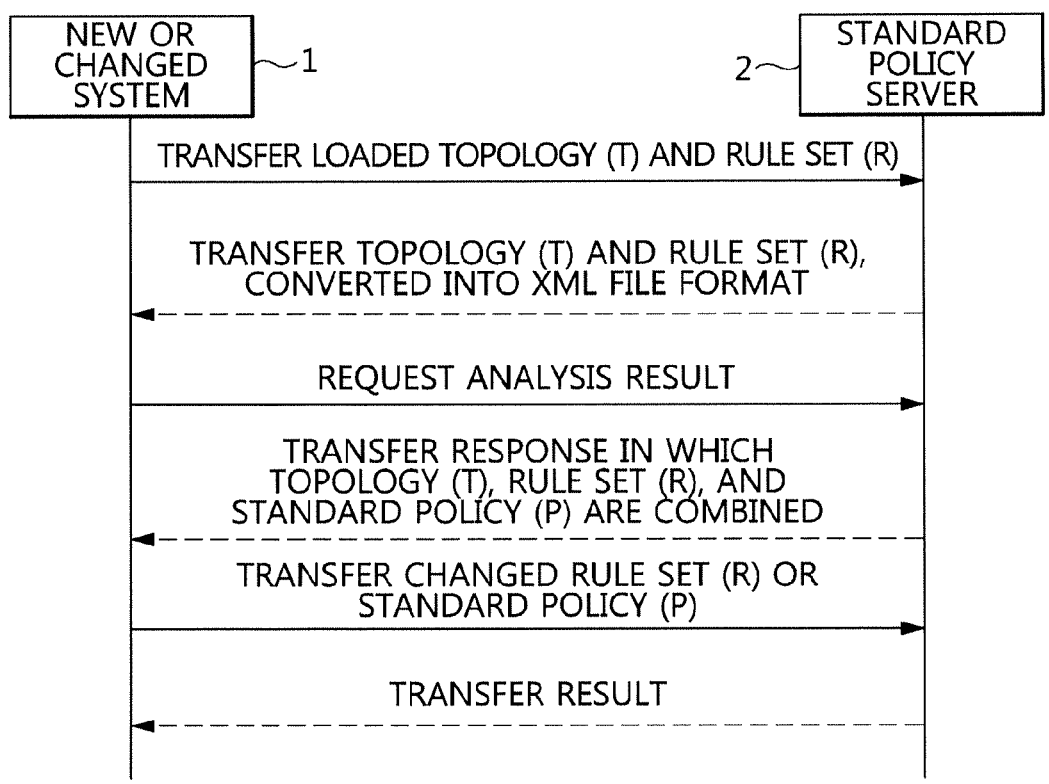
FIGS. 10 and 11 show a second embodiment of the process in which a consistency check unit verifies consistency.
Figure 11:
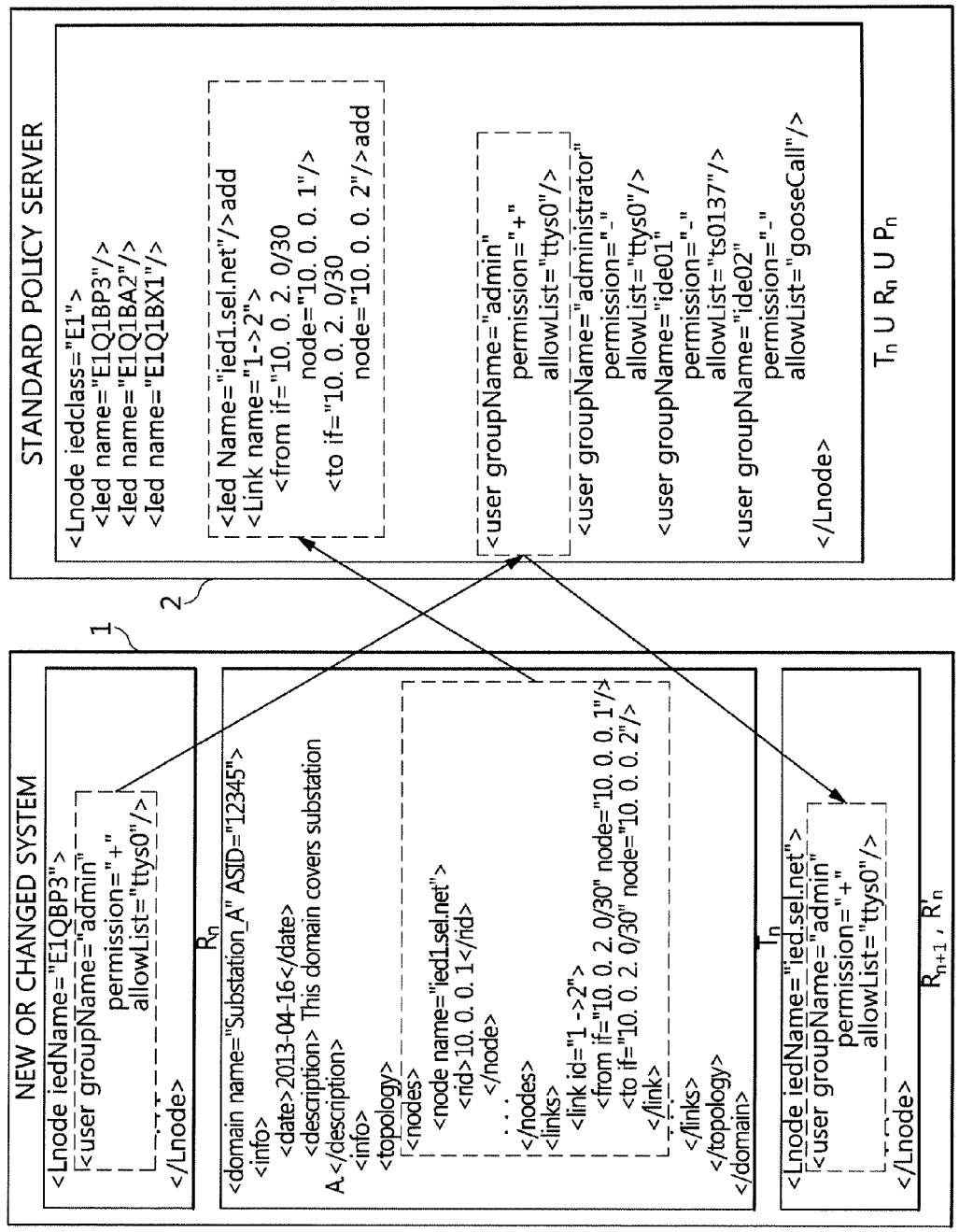

FIGS. 10 and 11 illustrate a second embodiment of the process in which a consistency check unit verifies consistency.

Referring to FIGS. 10 and 11, a new system or a changed system 1 sends a loaded topology T and a changed rule set R and receives a changed standard access policy from a standard policy server 2. Here, the rule set of each of the systems is sent in the form of R.xml, and the standard policy is sent in the form of P.xml.

If policy violations are found, two processes may be performed. Because an administrator or a security manager needs to check the violations, the corresponding section is marked in the output. First, in order to enable the administrator or the security manager to revise the specific section of the rule set (R.xml), the position of the section and the reference basis of the violation are marked.

Second, the rule set (R.xml) that cannot be merged in the existing policy is defined as an exception to the policy and then is included in the standard policy (P.xml).

Referring to FIG. 11, the process of marking a section to be revised in $R_{n+1}$ and $R_n'$ and the process of searching for the basis of the violation and marking the position of the basis in $T_n \cup R_n \cup R_n$ are performed.

Hereinafter, a security policy management method according to the present invention will be described.

Repeated descriptions of the security policy management apparatus 100 according to the present invention will be omitted.

Figure 12:
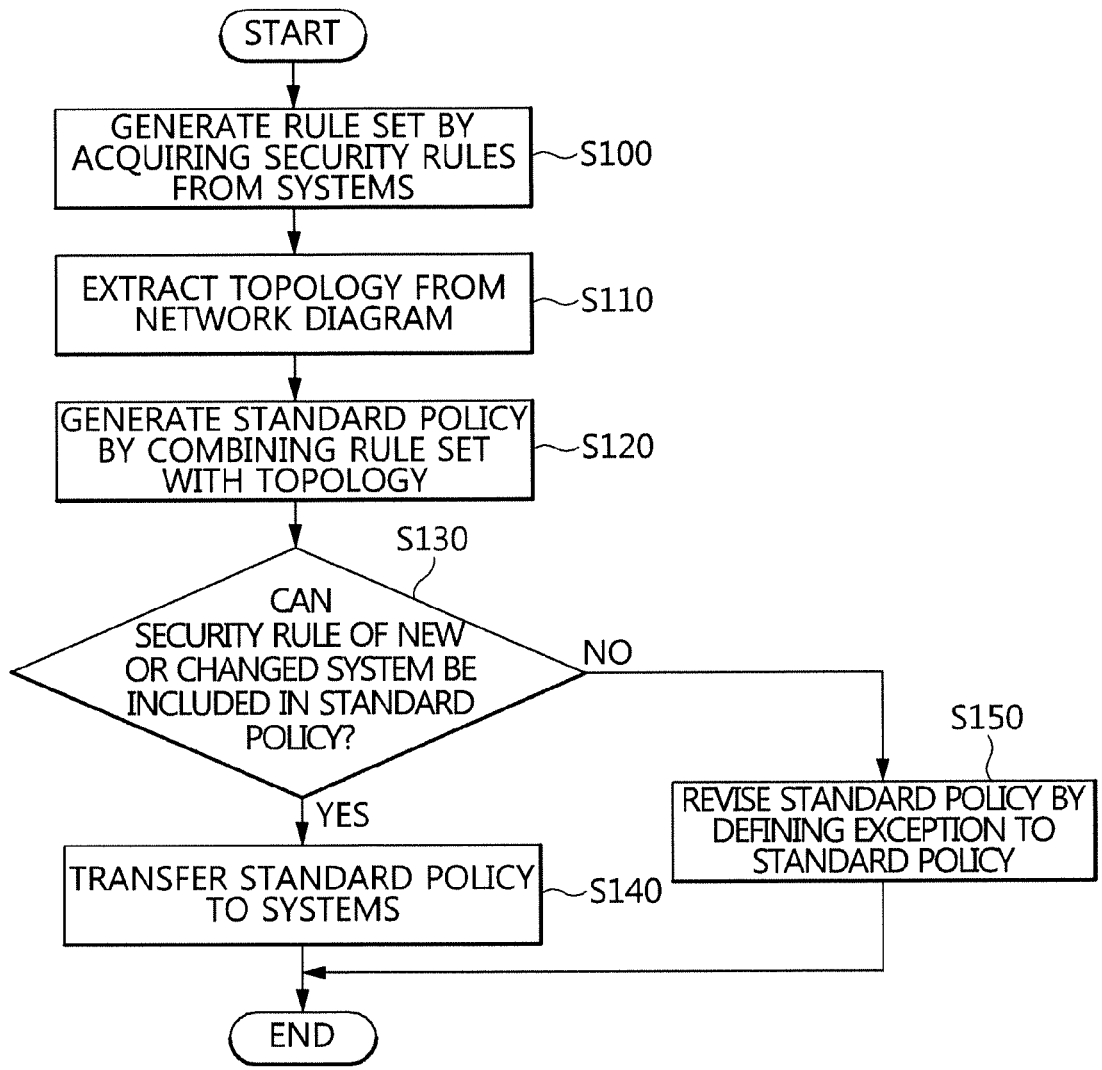
FIG. 12 is a flowchart of a security policy management method according to a first embodiment of the present invention.
Figure 13:
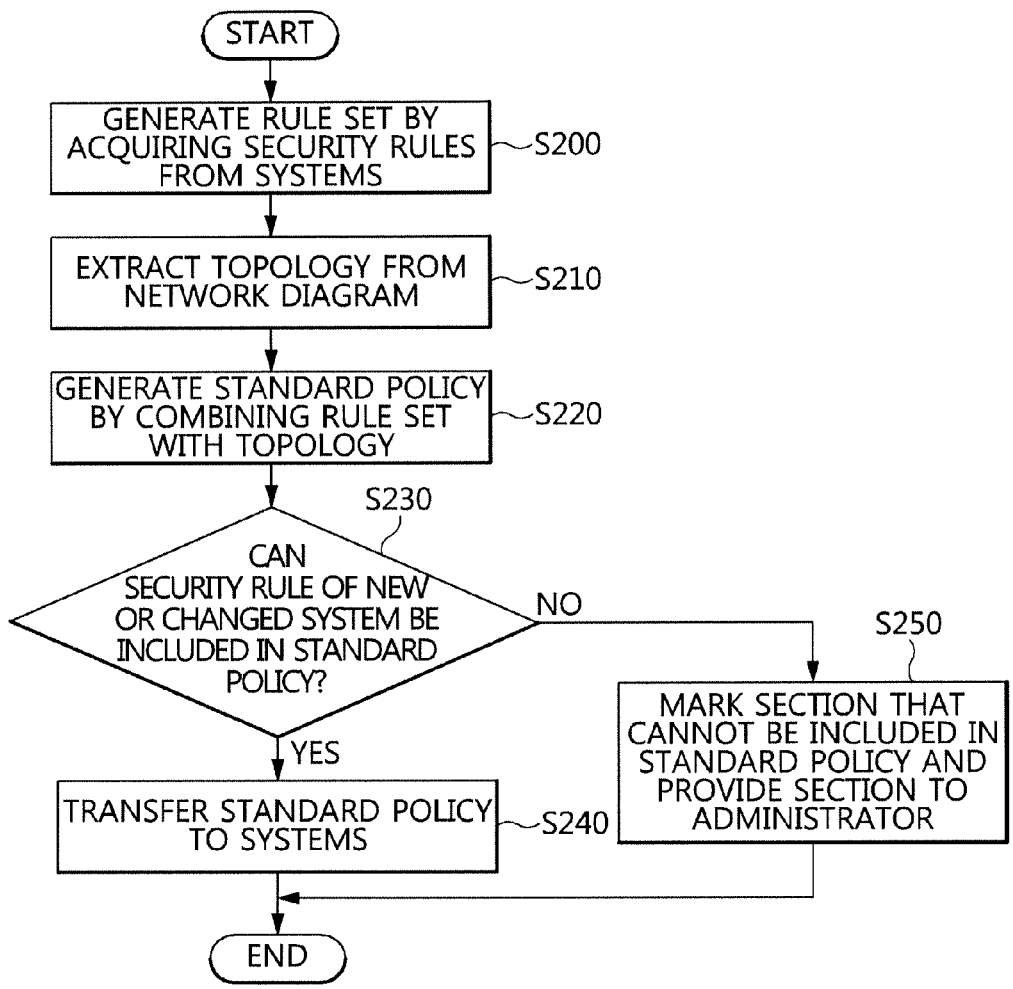
FIG. 13 is a flowchart of a security policy management method according to a second embodiment of the present invention.

FIG. 12 is a flowchart of a security policy management method according to a first embodiment of the present invention. FIG. 13 is a flowchart of a security policy management method according to a second embodiment of the present invention.

Referring to FIG. 12, in a security policy management method according to a first embodiment of the present invention, first, a rule set is generated at step S100 by acquiring security rules from systems.

Specifically, at step S100, predefined access policy security rules are acquired from one or more systems and are converted into a document in a standard format, whereby a rule set is generated.

Here, at step 100, security rules, having types corresponding to one or more of an access control server system, a configuration of a PC, and a document file, are acquired from one or more systems. Then, a rule set may be generated by converting the acquired access policy security rules into an XML format, and the converted rule set may be stored.

Then, a topology is extracted from a network diagram at step S110.

Specifically, at step S110, a network topology is extracted from the network diagram of the entire system, the security rules of which are to be integrated.

Here, at step S110, the network topology may be extracted in XML format, and the extracted network topology may be stored. The topology includes the types and configurations of multiple electric power devices existing at a site. Also, the topology may include information about the network between the multiple electric power devices.

Then, the rule set generated at step S100 and the topology extracted at step S110 are combined, whereby a standard policy is generated at step S120.

Here, at step S120, the standard policy may be generated in XML format, and the generated standard policy may be stored.

Then, at step S130, whether a security rule of a new or changed system can be included in the standard policy is checked. If it is determined that the security rule can be included in the standard policy, the standard policy is sent to the systems at step S140. Conversely, if it is determined that the security rule cannot be included in the standard policy, the standard policy is revised by defining an exception to the standard policy at step S150, whereby the security policy management method according to the first embodiment of the present invention is terminated.

Referring to FIG. 13, in a security policy management method according to a second embodiment of the present invention, first, a rule set is generated at step S200 by acquiring security rules from systems.

Specifically, at step S200, predefined access policy security rules are acquired from one or more systems and are converted into a document in a standard format, whereby a rule set is generated.

Here, at step 200, security rules, having types corresponding to one or more of an access control server system, a configuration of a PC, and a document file, are acquired from one or more systems. Then, a rule set may be generated by converting the acquired access policy security rules into XML format, and the converted rule set may be stored.

Then, a topology is extracted from a network diagram at step S210.

Specifically, at step S210, a network topology is extracted from the network diagram of the entire system, the security rules of which are to be integrated.

Here, at step S210, the network topology may be extracted in XML format, and the extracted network topology may be stored. The topology includes the types and configurations of multiple electric power devices existing at a site. Also, the topology may include information about the network between the multiple electric power devices.

Then, the rule set generated at step S200 and the topology extracted at step S210 are combined, whereby a standard policy is generated at step S220.

Here, at step S220, the standard policy may be generated in XML format, and the generated standard policy may be stored.

Then, at step S230, whether a security rule of a new or changed system can be included in the standard policy is checked. If it is determined that the security rule can be included in the standard policy, the standard policy is sent to the systems at step S240. Conversely, if it is determined that the security rule cannot be included in the standard policy, the section of the security rule that cannot be included in the standard policy is marked and the result is provided to an administrator at step S250, whereby the security policy management method according to the present invention is terminated.

As described above, in an existing smart grid environment, because the process of applying the policies of distributed systems is manually performed without a system and only some of the access control policies are applied, there are many problems with the integrated management thereof. However, the security policy management apparatus 100 and the security policy management method according to the present invention may accurately analyze conflicts between network access policies or errors in the policies, whereby the security of interoperation between systems in a smart grid environment may be maximized.

Also, the present invention may be used for detecting threats to the security of the smart grid environment based on IEC 61850. For example, a threat detection rule may be defined such that entries for detecting security policy violations are written in the header of the rule and entries for detection through signature mapping are written in the body thereof. Accordingly, when unauthorized users or unauthorized systems illegally attempt to access a control system, this rule may be used to detect such a threat because the security policy of the system is reflected in the rule.

According to the present invention, various security rules of different systems are automatically collected and integrated according to a standard format, whereby conflicts between network access policies and errors in the policies may be accurately detected.

Also, according to the present invention, distributed security policies are integrated and applied in a smart grid environment based on IEC 61850, whereby security of interoperation between systems in a smart grid environment may be maximized.

As described above, the apparatus and method for security policy management according to the present invention are not limitedly applied to the configurations and operations of the above-described embodiments, but all or some of the embodiments may be selectively combined and configured, so that the embodiments may be modified in various ways.

What is claimed is:

1. An apparatus for security policy management, comprising a processor configured to:
generate a rule set by converting predefined access policy security rules acquired from one or more systems into a document in a standard format;
extract a network topology from a network diagram concerning the one or more systems; and
generate a standard policy for plural systems by adding up unions of the generated rule set, each of the unions being applied to each of the plural systems, and the extracted network topology,
wherein the standard policy is represented as follows:

$$P_i = \sum_{j=1}^{k} R_{i,j} \cup T_i,$$

wherein $R_{i,j}$ is a security rule one system, $T_i$ the network topology, and $P_i$ is the standard policy,
wherein when a new system (n+1) is added to the one system, the processor is further configured to perform a first consistency verification process which is represented as follows:

$$R_{n+1} \subset \sum_{j=1}^{k} R_{i,j} \cup T_i,$$

wherein $R_{n+1}$ is a security rule of the new system,
wherein, when the one system is changed to another system, the processor performs a second consistency verification process which is represented as follows:

$$R'_n \subset \sum_{j=1}^{k} R_{i,j} \cup T_i,$$

wherein $R_n'$ is a security rule of the changed system,
wherein the processor is further configured to determine whether the security rule of the new system or the security rule of the changed system is included as a part of the standard policy,
wherein the processor automatically collects security rules from the one or more systems and integrates the collected security rules in the standard format to accurately analyze conflicts between network access policies and errors in the network access policies, and
wherein the processor is further configured to generate the rule set by converting the acquired access policy security rules into an XML format by adding a verified standard policy file in a lowermost part of the acquired access policy security rules for each of one or more systems and to store the converted rules.

2. The apparatus of claim 1, wherein the security rules have types corresponding to one or more of an access control server system, a configuration of a PC, and a document file.

3. The apparatus of claim 1, wherein the processor is further configured to extract the network topology in the XML format and to store the extracted network topology.

4. The apparatus of claim 3, wherein the network topology includes a kind and a configuration of multiple electric power devices existing at a site and information about a network between the multiple electric power devices.

5. The apparatus of claim 1, wherein the processor is further configured to generate the standard policy in the XML format and to store the generated standard policy.

6. The apparatus of claim 1, wherein the processor is further configured to revise the standard policy by defining the security rule of the new system or the security rule of the changed system as an exception to the standard policy when it is determined that the security rule of the new system or the security rule of the changed system is incapable of being included as a part of the standard policy.

7. The apparatus of claim 1, wherein:
when it is determined that the security rule of the new system or the security rule of the changed system is incapable of being included as a part of the standard policy, the processor is further configured to mark a section that is incapable of being included as a part of the standard policy in the security rule of the new system or in the security rule of the changed system and then provides the security rule to an administrator.

8. The apparatus of claim 1, wherein the processor is further configured to transfer the standard policy to one or more systems when it is determined that the security rule of the new system or the security rule of the changed system is capable of being included as a part of the standard policy.

9. A method for security policy management, comprising:
generating, by a processor, a rule set by converting predefined access policy security rules acquired from one or more systems into a document in a standard format;
extracting, by the processor, a network topology from a network diagram concerning the one or more systems; and
generating, by the processor, a standard policy for plural systems by adding up unions of the generated rule set, each of the unions being applied to each of the plural systems, and the extracted network topology,
wherein the standard policy is represented as follows:

$$P_i = \sum_{j=1}^{k} R_{i,j} \cup T_i,$$

wherein $R_{i,j}$ is a security rule one system, $T_i$ the network topology, and $P_i$ is the standard policy,
wherein when a new system (n+1) is added to the one system, the processor is further configured to perform a first consistency verification process which is represented as follows:

$$R_{n+1} \subset \sum_{j=1}^{k} R_{i,j} \cup T_i,$$

wherein $R_{n+1}$ is a security rule of the new system,
wherein, when the one system is changed to another system, the processor performs a second consistency verification process which is represented as follows:

$$R'_n \subset \sum_{j=1}^{k} R_{i,j} \cup T_i,$$

wherein $R_n'$ is a security rule of the changed system,
wherein the processor is further configured to determine whether the security rule of the new system or the security rule of the changed system is included as a part of the standard policy, and
wherein the processor automatically collects security rules from the one or more systems and integrates the collected security rules in the standard format to accurately analyze conflicts between network access policies and errors in the network access policies,
wherein the generating of the rule set is configured to generate the rule set by converting the acquired access policy security rules into an XML format by adding a verified standard policy file in a lowermost part of the acquired access policy security rules for each of one or more systems and to store the converted rules.

10. The method of claim 9, wherein the security rules have types corresponding to one or more of an access control server system, a configuration of a PC, and a document file.

11. The method of claim 9, wherein the extracting of the network topology is configured to extract the network topology in the XML format and to store the extracted network topology.

12. The method of claim 11, wherein the network topology includes a kind and a configuration of multiple electric power devices existing at a site and information about a network between the multiple electric power devices.

13. The method of claim 9, wherein the generating of the standard policy is configured to generate the standard policy in the XML format and to store the generated standard policy.

14. The method of claim 9, further comprising:
if it is determined in the checking of the consistency that the security rule of the new system or the security rule of the changed system is incapable of being included as a part of the standard policy,
revising, by the processor, the standard policy by defining the security rule of the new system or the security rule of the changed system as an exception to the standard policy.

15. The method of claim 9, further comprising:
if it is determined in the checking of the consistency that the security rule of the new system or the security rule of the changed system is incapable of being included as a part of the standard policy,
marking, by the processor, a section that is incapable of being included as a part of the standard policy in the security rule of the new system or in the security rule of the changed system and then providing the security rule to an administrator.

16. The method of claim 9, further comprising:
if it is determined in the checking of the consistency that the security rule of the new system or the security rule of the changed system is capable of being included as a part of the standard policy,
transferring, by the processor, the standard policy to the one or more systems.

* * * * *